(12) United States Patent
Tu et al.

(10) Patent No.: US 7,554,599 B2
(45) Date of Patent: Jun. 30, 2009

(54) IMAGE SENSOR MODULE WITH AIR ESCAPE HOLE AND A METHOD FOR MANUFACTURING THE SAME

(75) Inventors: Hsiu wen Tu, Hsinchu Hsien (TW); Mon nan Ho, Hsinchu Hsien (TW); Jason Chuang, Hsinchu Hsien (TW); Chen pin Peng, Hsinchu Hsien (TW); Chung hsien Hsin, Hsinchu Hsien (TW); Wei Chang, Hsinchu Hsien (TW)

(73) Assignee: Kingpak Technology, Inc., Hsinchu Hsien (TW)

( * ) Notice: Subject to any disclaimer, the term of this patent is extended or adjusted under 35 U.S.C. 154(b) by 491 days.

(21) Appl. No.: 11/367,867

(22) Filed: Mar. 2, 2006

(65) Prior Publication Data

US 2007/0206109 A1    Sep. 6, 2007

(51) Int. Cl.
*H04N 5/225*    (2006.01)
(52) U.S. Cl. ...................................... 348/340; 348/374
(58) Field of Classification Search ................... 348/340
See application file for complete search history.

(56) References Cited

U.S. PATENT DOCUMENTS

2002/0131782 A1*  9/2002  Yamaguchi et al. ......... 396/429
2004/0183936 A1*  9/2004  Kim et al. ................... 348/340

* cited by examiner

*Primary Examiner*—Tuan V Ho
*Assistant Examiner*—Chia-Wei A Chen
(74) *Attorney, Agent, or Firm*—Reed Smith LLP; Juan Carlos A. Marquez, Esq.

(57) ABSTRACT

An image sensor module with air escape hole includes a substrate having an upper surface and a lower surface. A chip is mounted on the upper surface of the substrate. A plurality of wires are electrically connected the chip to the upper surface of the substrate. An adhered layer is coated on the upper surface of the substrate. A lens holder is mounted on the upper surface of the substrate by the adhered glue, and formed with a top wall, a lateral wall, and an internal thread, wherein the top wall is formed with an air escape hole. A lens barrel is formed with an external thread screwed on the internal thread of the lens holder. And a filled glue is filled within the air escape hole of the lens holder.

9 Claims, 2 Drawing Sheets

IMAGE SENSOR MODULE WITH AIR ESCAPE HOLE AND A METHOD FOR MANUFACTURING THE SAME

BACKGROUND OF THE INVENTION

1. Field of the Invention

The invention relates an image sensor module with air escape hole and a method for manufacturing the same, and particular to a structure for packaging image sensor module, the reliability may be increased.

2. Description of the Related Art

Referring to FIG. 1, it is an image sensor module includes a substrate 10, a chip 20, a plurality of wires 24, a adhered glue 26, a lens holder 28 and a lens barrel 32.

The substrate 10 has an first surface 12 on which plurality of first electrodes 16 are formed, and a second surface 14 on which plurality of second electrodes 18 are formed, the first electrodes 16 are corresponding to electrically connect to the second electrodes 18.

The chip 20 is arranged on the first surface 12 of the substrate 10, and is formed with bonding pads 22.

The wires 24 are electrically connected the bonding pad 22 of the chip 20 to the first electrodes 16 of the substrate 10.

The adhered layer 26 is coated on the upper surface 12 of the substrate 10.

The lens holder 28 is formed with internal thread 30, and is mounted on the first surface 12 of the substrate 20 by the adhered glue 26.

The lens barrel 46 is formed with external thread 39 screwed on the internal thread 30 of the lens holder 28.

SUMMARY OF THE INVENTION

An objective of the invention is to provide an image sensor module with air escape hole and a method for manufacturing the same, and capable of increasing the reliability of the module.

To achieve the above-mentioned object, the invention includes a substrate having an upper surface and a lower surface. A chip is mounted on the upper surface of the substrate. A plurality of wires are electrically connected the chip to the upper surface of the substrate. An adhered layer is coated on the upper surface of the substrate. A lens holder is mounted on the upper surface of the substrate by the adhered glue, and formed with a top wall, a lateral wall, and an internal thread, wherein the top wall is formed with an air escape hole. A lens barrel is formed with an external thread screwed on the internal thread of the lens holder. And filled glue is filled within the air escape hole of the lens holder.

DETAILED DESCRIPTION OF THE INVENTION

Figure 1:
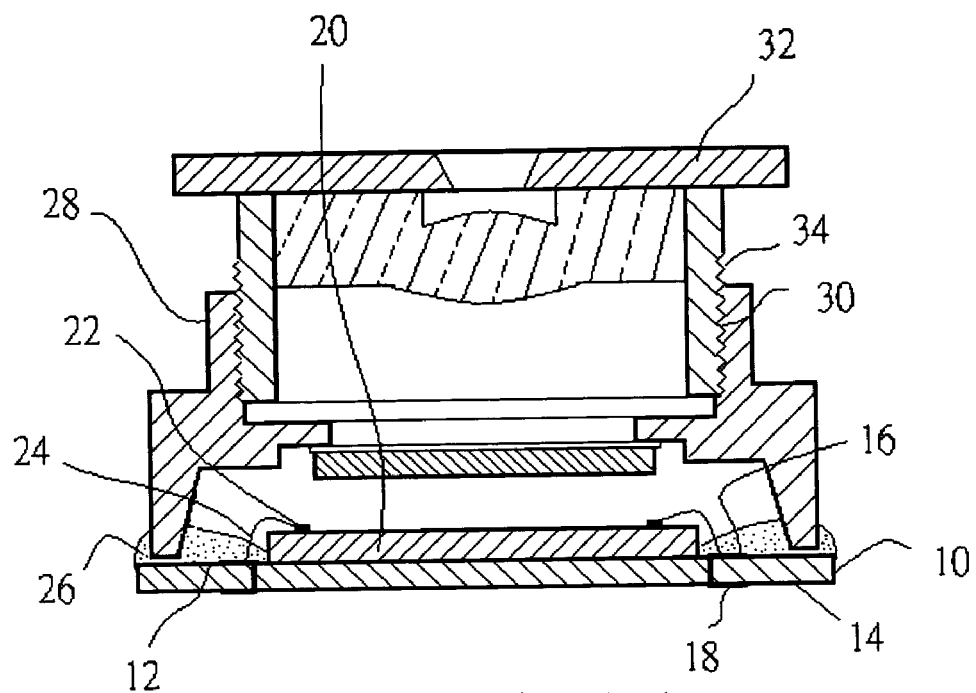
FIG. 1 is a schematic illustration showing a conventional image sensor module.
Figure 2:
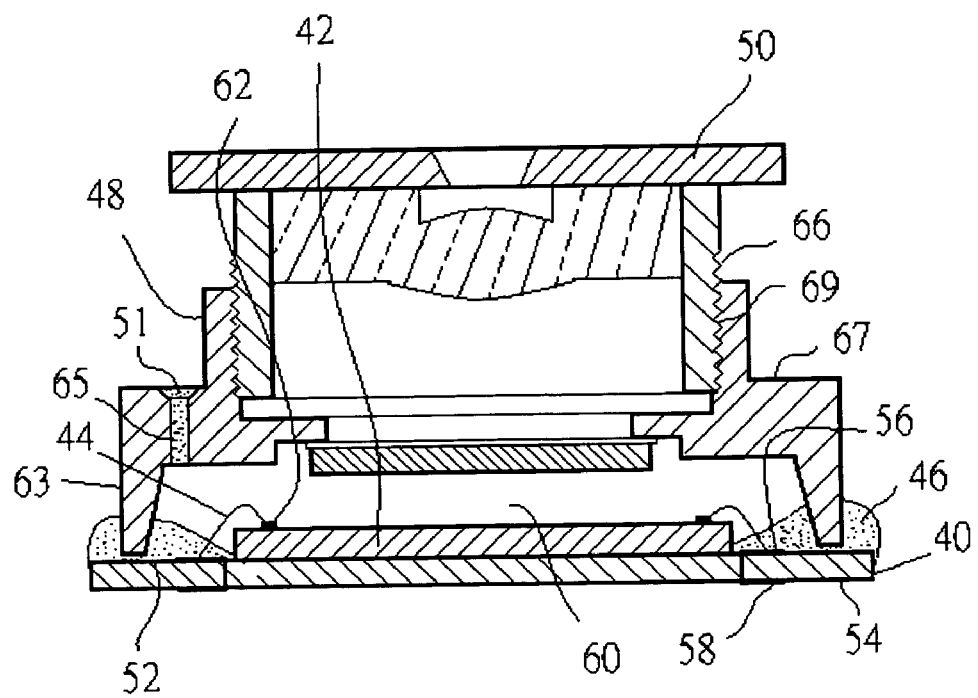
FIG. 2 is a cross-sectional schematic illustration showing an image sensor module with air escape hole of the present invention.

Please refer to FIG. 2, an image sensor module with air escape hole includes a substrate 40, a chip 42, wires 44, an adhered layer 46, a lens holder 48, a lens barrel 50, and filled glue 51.

The substrate 40 has an upper surface 52, which is formed with first electrodes 56, and a lower surface 54, which is formed with second electrodes 58 corresponding to electrically connect to the first electrodes 54.

The chip 42 is mounted on the upper surface 52 of the substrate 40, the chip has a sensor region 60 and a plurality of bonding pads 62 located at the side of the sensor region 60 of the chip 42.

a plurality of wires 44 are electrically connected the bonding pads 62 of the chip 42 to the first electrodes 56 of the substrate 40.

The adhered layer 46 is coated on the upper surface 52 of the substrate 40.

The lens holder 48 is mounted on the upper surface 52 of the substrate 40 by the adhered layer 46, and is formed with a top wall 67, a lateral wall 63, and an internal thread 69, the top wall 67 is formed with an air escape hole 65 penetrated the top wall 67. Therefore, the pressure of the lens holder 48 may be relaxed through the air escape hole 65.

The lens barrel 50 is formed with an external thread 66 screwed on the internal thread 69 of the lens holder 48. And The filled glue 51 is form of epoxy, and is filled within the air escape hole 65 of the lens holder 48.

Figure 3:
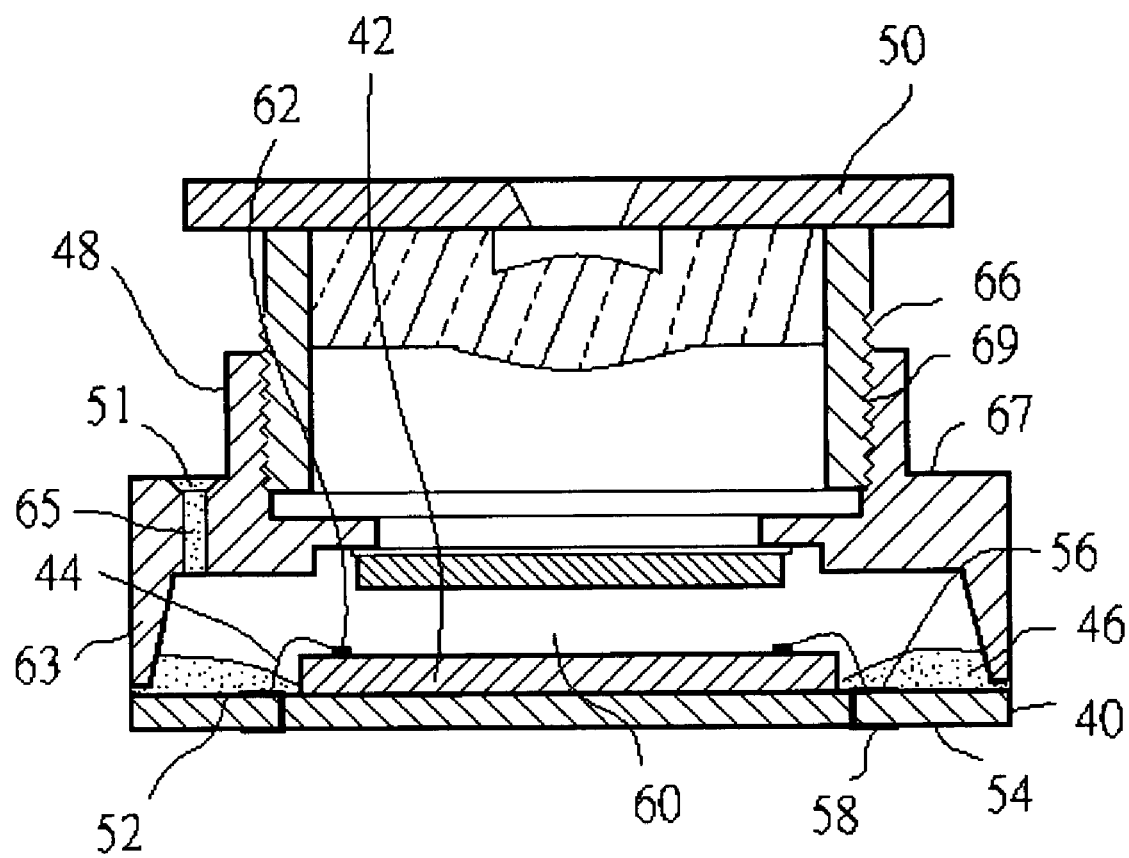
FIG. 3 is a cross-view schematic illustration showing a method for manufacturing an image sensor module with air escape hole of the present invention.

Please refer to FIG. 3, it is a method for manufacturing the image sensor module with an air escape hole of the present invention. Outer portions of the lateral wall 63 of the lens holder 48 and of the substrate 40 adhered on the lateral wall 63 of the lens holder 48 are cut, so the resulting outer surfaces of the lateral wall 63 of the lens holder 48 and of the substrate 40 adhered on the lateral wall 63 of the lens holder 48 have cut surfaces in the same plane to form a smaller size module.

The image sensor module and manufacturing method in accordance with the embodiments of the invention have the advantages as follows.

1. By cutting the lateral wall 63 of the lens holder 48 and the substrate 40 adhered on the lateral wall 63 of the lens holder 48, the size of the image sensor module may be decreased.

2. Since the lens holder 48 has an air escape hole 65, so that the internal pressure of the module may be relaxed.

While the invention has been described by the way of an example and in terms of a preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

What is claimed is:

1. An image sensor module with air escape hole, the module comprising:

a substrate having an upper surface, which is formed with first electrodes, and a lower surface, which is formed with second electrodes corresponding to electrically connect to the first electrodes;

a chip mounted on the upper surface of the substrate, the chip having a sensor region and a plurality of bonding pads located at the side of the sensor region;

a plurality of wires electrically connected the bonding pads of the chip to the first electrodes of the substrate;

an adhesive layer coated on the upper surface of the substrate;

a lens holder mounted on the upper surface of the substrate by the adhesive layer, and formed with a top wall, a lateral wall, and an internal thread, the top wall formed with an air escape hole;

a lens barrel formed with an external thread screwed on the internal thread of the lens holder; and a filled glue filled within the air escape hole of the lens holder.

2. The image sensor module with air escape hole according to claim 1, wherein the filled glue is formed of epoxy.

3. The image sensor module with air escape hole according to claim 1, wherein the outer surface of the lateral wall of the lens holder and of the substrate adhered on the lateral wall of the lens holder have cut surfaces in the same plane.

4. A method for manufacturing the image sensor module with air escape hole, comprising the steps of:

providing a substrate having an upper surface, which is formed with first electrodes, and a lower surface, which is formed with second electrodes corresponding to electrically connect to the first electrodes;

mounting a chip on the upper surface of the substrate, the chip having a sensor region and a plurality of bonding pads located at the side of the sensor region;

electrically connecting a plurality of wires to the bonding pads of the chip and the first electrodes of the substrate;

coating an adhesive layer on the upper surface of the substrate;

mounting a lens holder, which forms with a top wall, a lateral wall and an internal thread, on the upper surface of the substrate by the adhesive layer, and forming an air escape hole through the top wall;

screwing a lens barrel formed with an external thread on the internal thread of the lens holder; and filling a filled glue within the air escape hole of the lens holder.

5. The method according to claim 4, wherein the filled glue is formed of epoxy.

6. The method according to claim 4, further comprising cutting outer portions of the lateral wall of the lens holder and of the substrate adhered on the lateral wall of the lens holder.

7. An image sensor module with air escape hole, the module comprising:

a substrate having an upper surface, which is formed with first electrodes, and a lower surface, which is formed with second electrodes corresponding to electrically connect to the first electrodes;

a chip mounted on the upper surface of the substrate, the chip having a sensor region and a plurality of bonding pads located at the side of the sensor region;

a plurality of wires electrically connected the bonding pads of the chip to the first electrodes of the substrate;

an adhesive layer coated on the upper surface of the substrate;

a lens holder mounted on the upper surface of the substrate by the adhesive layer, and formed with a top wall, a lateral wall, and an internal thread; and a lens barrel formed with an external thread screwed on the internal thread of the lens holder, characterized in that an air escape hole is formed through the top wall, and a filled glue is filled within the air escape hole of the lens holder.

8. The image sensor module with air escape hole according to claim 7, wherein the filled glue is formed of epoxy.

9. The image sensor module with air escape hole according to claim 7, wherein the outer surface of the lateral wall of the lens holder and of the substrate adhered on the lateral wall of the lens holder have cut surfaces in the same plane.

* * * * *